E. P. SMITH.
FORMING AND ASSEMBLING MACHINE.
APPLICATION FILED APR. 7, 1915.

1,218,810.

Patented Mar. 13, 1917.
4 SHEETS—SHEET 1.

Witness
Chas. H. Pearl

Inventor
Elwyn P. Smith
By his Attorney

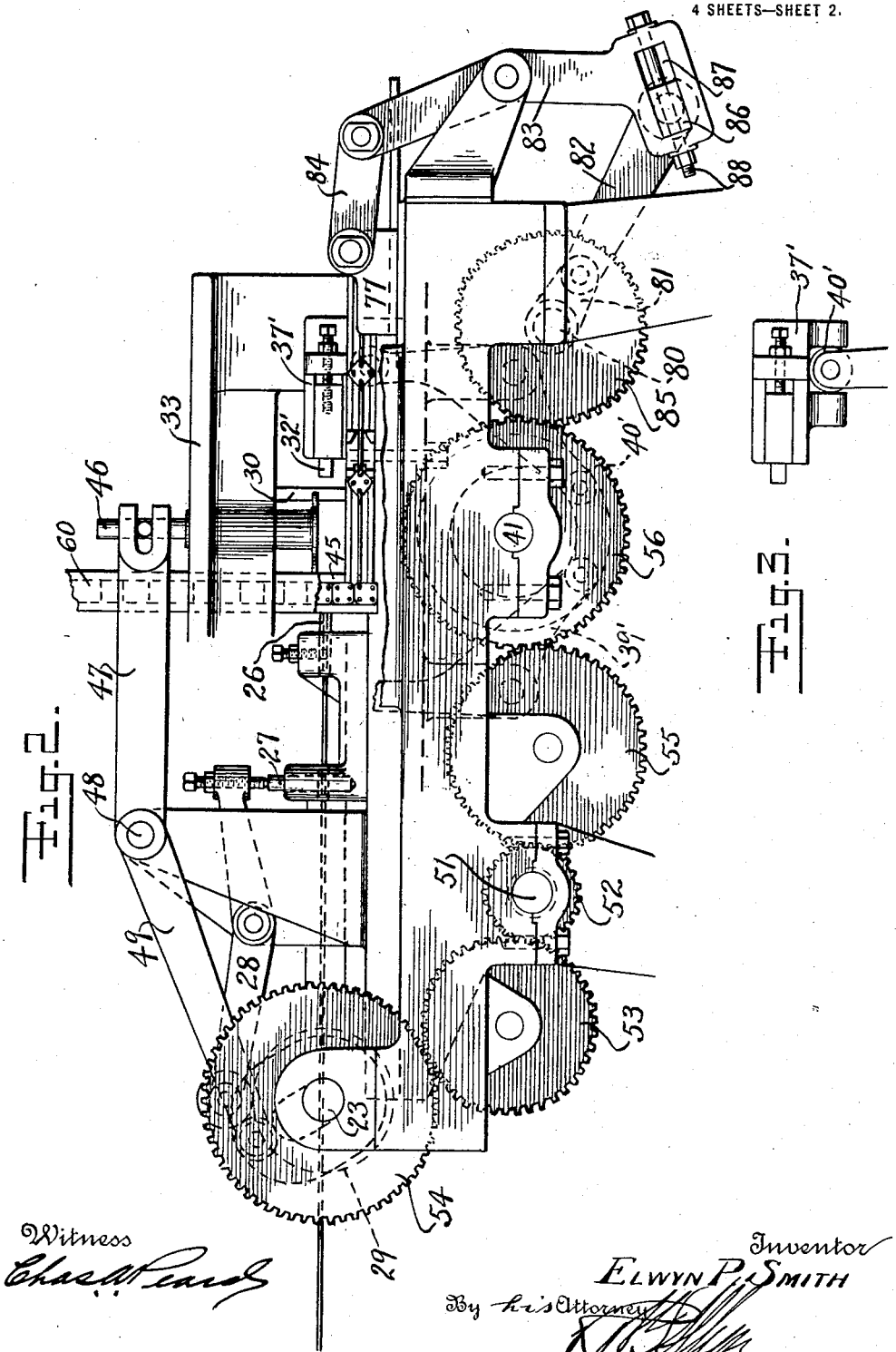

E. P. SMITH.
FORMING AND ASSEMBLING MACHINE.
APPLICATION FILED APR. 7, 1915.
1,218,810.
Patented Mar. 13, 1917.
4 SHEETS—SHEET 3.
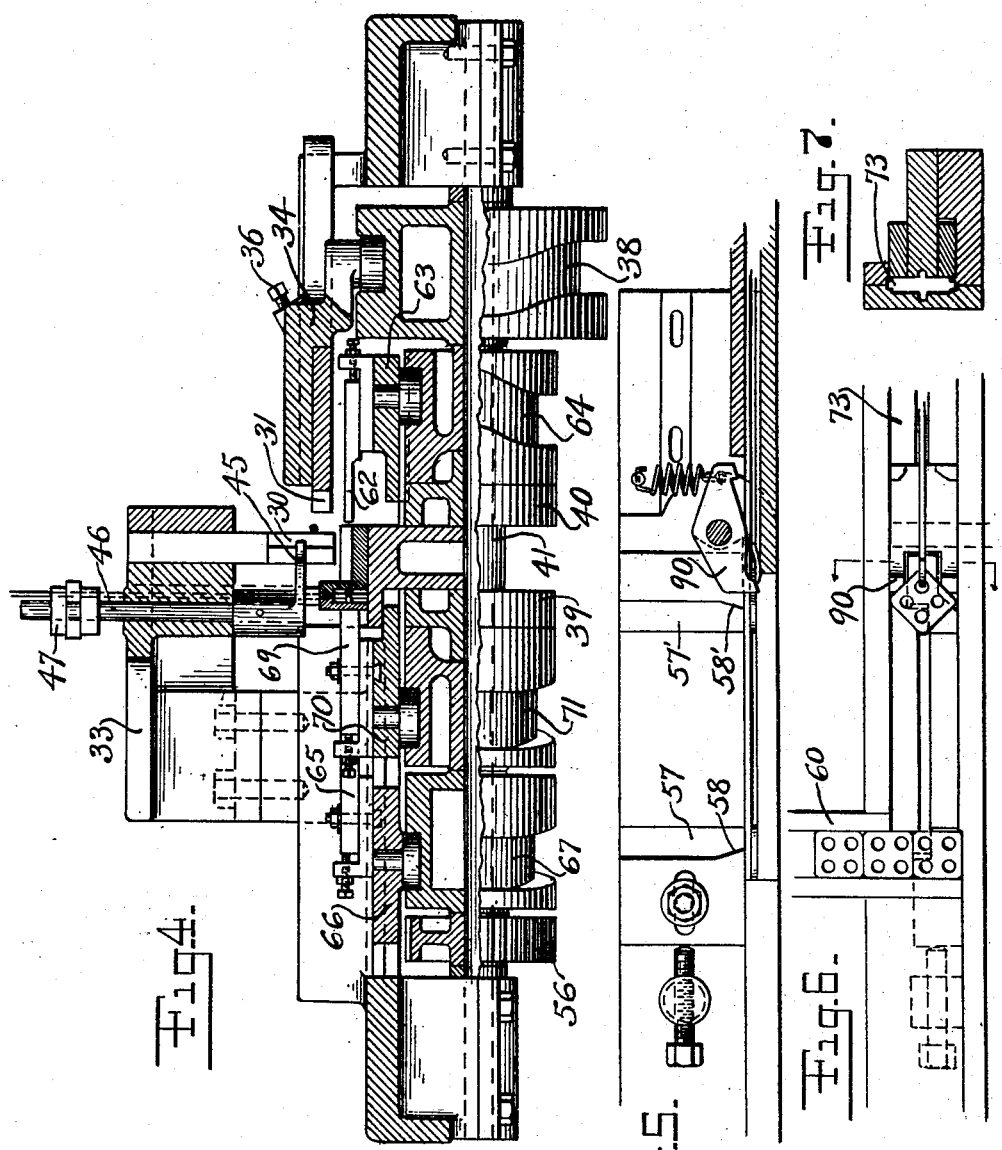
Witness
Chas. W. Pearl
Inventor
Elwyn P. Smith
By his Attorney

E. P. SMITH.
FORMING AND ASSEMBLING MACHINE.
APPLICATION FILED APR. 7, 1915.
1,218,810.
Patented Mar. 13, 1917.
4 SHEETS—SHEET 4.
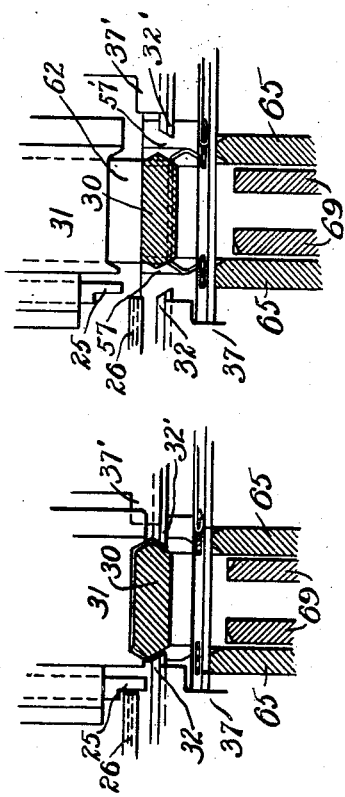
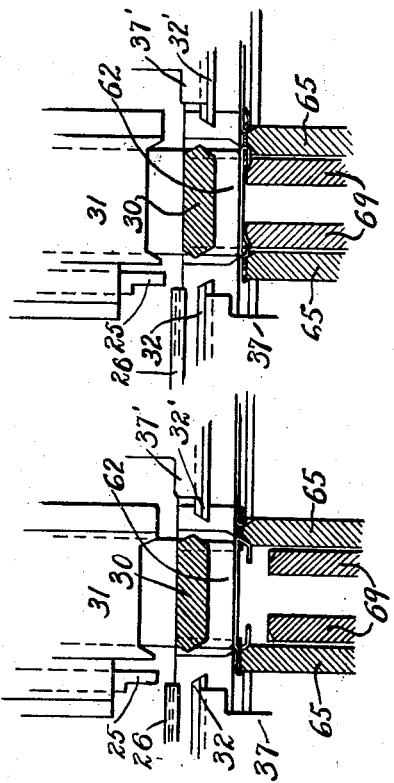
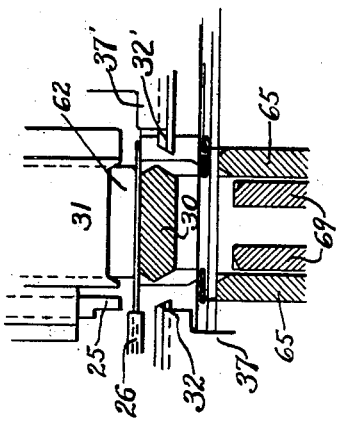
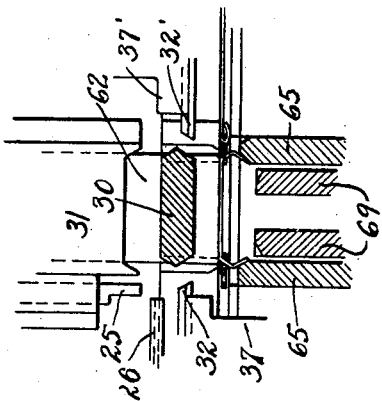
Witness
Chas H Pearl
Inventor
Elwyn P. Smith
By his Attorney

UNITED STATES PATENT OFFICE.

ELWYN P. SMITH, OF WATERBURY, CONNECTICUT, ASSIGNOR TO THE MATTATUCK MANUFACTURING COMPANY, OF WATERBURY, CONNECTICUT, A CORPORATION OF CONNECTICUT.

FORMING AND ASSEMBLING MACHINE.

1,218,810.

Specification of Letters Patent.

Patented Mar. 13, 1917.

Application filed April 7, 1915. Serial No. 19,718.

*To all whom it may concern:*

Be it known that I, ELWYN P. SMITH, a citizen of the United States of America, and residing at Waterbury, in the county of New Haven and State of Connecticut, have invented new and useful Improvements in Forming and Assembling Machines, of which the following is a specification.

My invention relates particularly to mechanism for automatically forming wire links from a continuous stock and automatically assembling such links with previously formed perforated plates to constitute a strand or chain.

Such chains and strands have been made automatically by assembling previously formed hooked links and perforated plates as set forth in the Bigelow Patents #1,043,896 and #1,043,898 and in the application of Charles W. Peck, #787, filed January 6, 1915. It is the purpose of my invention to form the links and assemble them with the plates in the same machine so as to reduce the number of machines necessary and increase the speed of operation. Another object is to simplify the construction and so arrange the parts that a machine may be made and operated economically. Another object is to provide for adjustment so that links of different lengths may be made and assembled in the machine.

According to the invention the wire is intermittently fed into the machine and a blank cut off from the end. This blank is bent to form around a mandrel by three tools so as to form partially hooked ends. As soon as the link is formed it is stripped downward from the end of the mandrel in front of a pusher which forces it forward through holes in the plates to be connected. As the link moves forward, the ends are slightly bent by reason of engagement with stationary shoulders and as the ends come through the plates they are further bent by means of movable curling tools, and as soon as the curling tools have operated the hooks are closed by clenching tools. The plates and links constituting the strands are automatically drawn out intermittently as soon as assembled. The wire feeding and holding elements and the stripper are all operated from a shaft at the entrance end of the machine. The slides carrying the cutoff, forming, and assembling tools are all operated by cams on a central shaft. The strand draw-out is operated by a system of levers and links from another shaft. All three shafts are driven from the main power shaft.

Fig. 2 is a front elevation, parts being broken away.

Fig. 3 is a detail view showing the connection between one of the slides for a side forming tool and its operating lever.

Fig. 4 is a vertical sectional view through the main cam shaft and showing the forming and assembling tools and slides.

Fig. 5 is a plan view and partial section showing a part of the link supports and strand guide.

Fig. 6 is a vertical projection showing the plate guide and part of the strand guide.

Fig. 7 is a cross sectional view of the strand guide.

Figs. 8 to 13 are diagrammatic plan views and partial sections showing the steps of cutting off the wire, forming the link and feeding, curling and clenching the link respectively.

Figure 1:
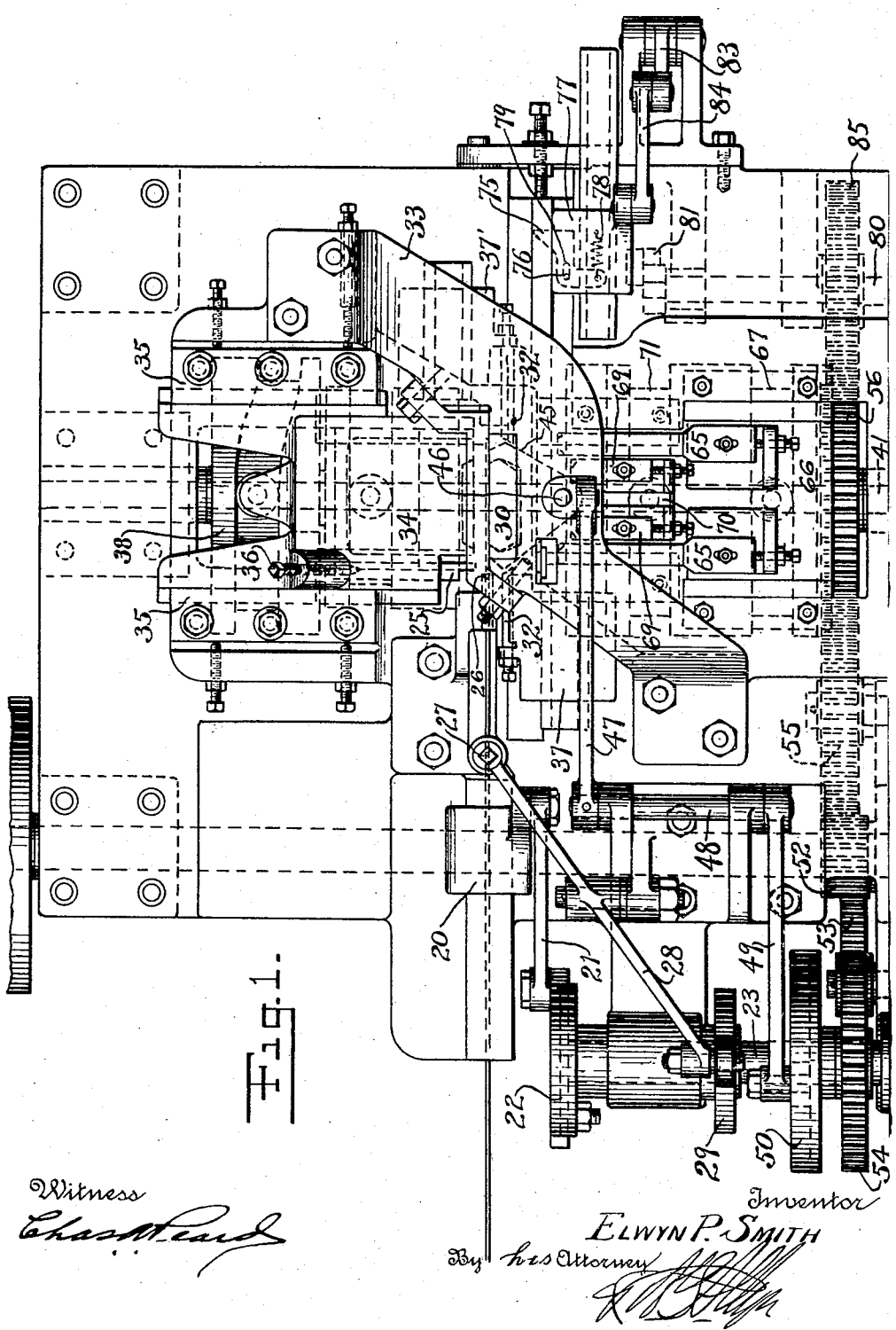
Figure 1 is a plan view of the machine showing in dotted lines parts which would otherwise be concealed.

The wire is fed into the machine by an intermittent action of the slide 20 which is provided with a suitable form of wire gripping device. This slide is operated by the link 21 connected to the disk 22, preferably in a suitable manner to permit of a relative adjustment of the feeding stroke. The disk 22 is carried by the shaft 23.

The proper length of wire for forming the link is cut off by the co-action of the movable cutter 25 and the bushing 26, through which the wire is fed.

During the return stroke of the feeding slide 20, the wire is held by a suitable hold-down device 27 operated intermittently by the rocker 28 and cam 29 on shaft 23.

The hooked link is formed from the wire cut off by the tools 25 and 26 by the co-action of the stationary vertical former mandrel 30, the horizontally movable main former tool 31 and the two side forming tools 32 and 32'. The stationary former mandrel is shaped to correspond with the interior shape of the hooked link and is supported from the bridge member 33. The main movable former tool 31 is carried by the slide 34, which is guided by side ways 35 which are preferably laterally adjustable. The movable cutter 25 is also carried by this same slide 34 and is adjustable by means of the set-screw 36. The side former tool 32 is carried by a slide 37 and the side former tool 32' is carried by the slide 37'. The former slides 34, 37 and 37' are operated by cams 38, 39 and 40 respectively on the shaft 41. Slides 37 and 37' are operated through the medium of levers 39' and 40' respectively.

When the link is formed and the forming tools retracted the link is free to fall down the former mandrel 30. Its downward movement is made certain by means of a stripper 45 carried by a plunger 46 which is guided in the bridge member 33. This stripper plunger is operated by a bell-crank lever having arm 47, shaft 48 and arm 49. The cam 50 on the shaft 23 has an operative connection with the arm 49 of the bell-crank lever.

Power is supplied to operate the parts thus far described from a shaft 51, having pinion 52 meshing with idle gear 53 which meshes with gear 54 on shaft 23. Pinion 52 also meshes with gear 55 which meshes with gear 56 on shaft 41. Each link as it is formed, falls or is pushed down onto supports 57 and 57' having inclined side walls 58, 58'.

The perforated plates are fed downward successively in a tube or vertical guide 60 into alinement with the rear hook on the link below the mandrel and they are held in a suitable manner for the insertion of the rear hook.

The hooked links are fed successively as formed toward the plates by a pusher 62 carried by a slide 63, which is operated from the cam 64 on the shaft 41. A plate being held in the strand guide opposite each end of the hooked link, a link is fed forward and its ends are bent by walls 58, 58' and pass through the holes in the adjacent corners of the two plates. As these hooked ends move forward they engage curling tools such as 65, which turn the opposite hooks slightly toward each other. These curling tools are carried by a slide 66 which is operated by a cam 67 on shaft 41.

After the hooks have been partially curled as thus described, they are bent to their final position by means of suitable clenching tools 69 which are carried by a slide 70 operated by cam 71 on shaft 41.

The assembled links and plates constitute the completed strand and are drawn out of the machine through a guide 73 by a suitable intermittently operated device. In the form herein shown the pawl 75 pivotally mounted on the pin 76 on the slide 77 is held yieldingly in its engaging position by the spring 78 and the pawl is also permitted to have a relatively short longitudinal movement by the slot 79 which receives the pin 76 so as to prevent injury in case the draw-out stroke is too long. The slide 77 is operated from the shaft 80 by means of a link motion consisting of a crank 81, link 82, lever 83 and link 84. The shaft 80 has a gear 85 meshing with gear 56 from which it receives its movement. The feeding stroke of the slide 77 may be adjusted in length as well as in position by means of a special connection between the link 82 and the lever 83. A block 86 connected to the link 82 slides in an inclined slot 87 in the end of the lever 83. This block is adjustable by means of a screw 88 so that when the block is adjusted longitudinally in the slot 87, the effective lever arm is altered at the same time that the angular position of the lever arm is varied. A suitable friction shoe or device (not shown) may be employed to hold the strand stationary during the return movement of the pawl from the feeding stroke.

The spring-pressed gage 90 limits the draw-out movement of the strand by engaging one of the plates. It may also be actuated by pins projecting from the cams 39 and 40. The support 57' and the gage may be adjusted longitudinally of the strand so as to accommodate links of different lengths. It will be obvious that formers of different sizes may be substituted for the formers 30 and 31 for the formation of links of different lengths and that for forming such different lengths of links the curling and clenching tools may be laterally adjustable to correspond.

The operation of the machine is substantially as follows: The proper length of wire is fed in and held and then cut off. During the cutting operation the wire feeding device is being retracted to the position of the beginning of the stroke. The proper length of wire is cut off by the movable and stationary cutters and practically simultaneously bent around the stationary former mandrel by the movable forming tools while the wire feeding device is moving back to its original position.

As soon as the forming tools are retracted the stripper forces the link downward onto its supports in front of the link pusher. The link pusher then forces the link forward so that its ends are inserted in two adjacent plates. The curling tools are moved toward the assembling position at the same time that the link is moved by the pusher. This curls over the ends of the link and then the clenching tools complete the bending operation while the link is backed up by the pusher. During most of the assembling operation the movable forming tools are stationary. The perforated plates may be fed downward to the assembling position by gravity. As soon as a link is secured the strand is drawn along the length of one link and one plate and a new plate fed down. Meanwhile a new link is being formed and the cycle is repeated.

What I claim is:—

1. In a machine of the character described, means for intermittently feeding wire, cutters for severing the blank from the end of the wire, forming tools for forming a partially hooked link from said blank, means for supplying perforated plates, tools for assembling the links with the plates, a stripper for moving the partially hooked link into position to be acted upon by the assembling tools, and means for drawing out the completed strand.

2. In a machine of the character described, a horizontal guide for wire stock including a stationary cutter, a horizontally movable cutter coöperating therewith, a main former tool, a vertical former mandrel, laterally movable side forming tools, a horizontally movable pusher beneath said main forming tool, means for supplying plates in line with one edge of said mandrel, curling tools horizontally movable opposite said pusher, clenching tools between said curling tools, and a horizontal strand guide.

3. In a machine of the character described, a wire feeding slide, a wire holding device, a link stripping device, a shaft, elements carried by said shaft connected respectively to said three previously mentioned elements for operating the same, link forming tools, tools for assembling a link with perforated plates, a second shaft, cams carried by said second shaft operatively connected with said forming and assembling tools for operating the same, a draw-out device, a third shaft, and means for connection between said third shaft and said draw-out device.

4. In a machine of the character described, a stationary mandrel for a hooked link, a pusher at the end of said mandrel, a stripper for removing a link from the end of said mandrel and placing it in front of said pusher, means for supplying perforated plates adjacent one edge of said mandrel at the end thereof, curling tools for partially bending the ends of the link when inserted through the plates, and means for drawing out the assembled strand.

5. In a machine of the character described, a stationary forming mandrel, means for feeding wire along the side of said mandrel, a slide, a main forming tool and a cut-off carried by said slide, side-forming tools for bending the ends of a partially formed link around the edges of said mandrel, slides carrying said side-forming tools, a shaft, a cam carried thereby for operating the slide carrying the main forming tool and cutter, other cams carried by said shaft, and levers operatively connecting said other cams and the slides for said side-forming tools.

6. In a machine of the character described, a link pushing tool, a slide therefor, link curling tools, a slide therefor, means for supplying perforated plates adjacent one of said curling tools, a shaft, cams carried by said shaft for operating said slides, and means for drawing out the product.

7. In a machine of the character described, the combination of horizontally operable wire feeding means, vertical guiding means for perforated plates, horizontally operable cut-off means, horizontally operable link bending means, horizontally operable link feeding means for feeding the end of a partially bent link through a plate, and means for drawing out the assembled links and plates.

8. In a machine of the character described, the combination of wire feeding means, means for cutting off the end of the wire to form a blank, means for bending the ends of the blank to form a link with bent ends, means for supplying perforated plates, means for assembling the links and plates, and means for bringing said previously mentioned means into operation successively, substantially as described.

9. In a machine of the character described, the combination of wire feeding means, means for cutting off the end of the wire to form a blank, a mandrel having two pairs of oppositely disposed angular faces, means for bending the ends of the blank about two of said faces, separate means for bending the tips of the blank about the other faces, means for feeding the blank after its ends have been bent so as to insert the ends of the blank into the holes of spaced-apart perforated plates, and coöperating means for closing the hooks.

ELWYN P. SMITH.

Witnesses:
HARRY C. WELTON,
WM. M. SAUNDERS.

Copies of this patent may be obtained for five cents each, by addressing the "Commissioner of Patents, Washington, D. C."